July 2, 1946.     J. B. PARSONS     2,403,020
CYLINDER ASSEMBLY
Filed March 24, 1944
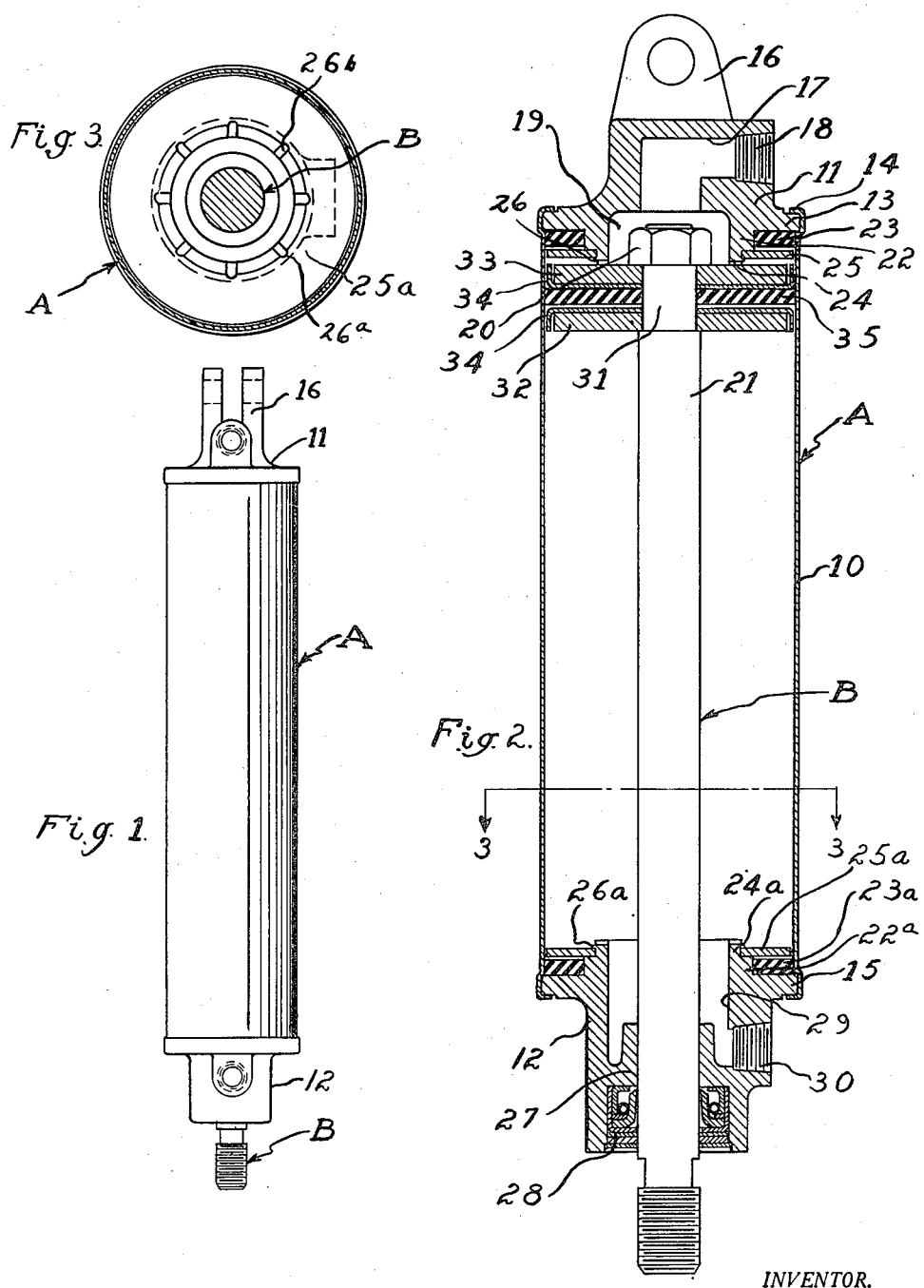
INVENTOR.
John B. Parsons
BY Malcolm W. Fraser
ATTY.

UNITED STATES PATENT OFFICE 2,403,020

CYLINDER ASSEMBLY

John B. Parsons, Toledo, Ohio

Application March 24, 1944, Serial No. 527,884

1 Claim. (Cl. 309—2)

This invention relates to fluid actuated cylinder and piston assemblies but particularly to an assembly of this character employing a liquid and used, for example, in the actuation of convertible tops for automobiles in which the piston is power operated in both directions of movement, and an object is to produce a simple and efficient assembly of this character which lends itself particularly to large scale manufacture, which is simple to assemble, which is fluid tight, and which can be inexpensively manufactured.

An illustrated embodiment of the invention is shown by way of illustration on the accompanying drawing in which Figure 1 is a side elevation of the cylinder and piston assembly;

Figure 2 is an enlarged longitudinal sectional view of the assembly; and

Figure 3 is a transverse sectional view along the line 3—3 of Figure 2.

The illustrated embodiment of the invention comprises an hydraulic cylinder and piston assembly in which A designates the cylinder and B designates the piston which is reciprocable within the cylinder. The cylinder A comprises an elongate tube 10 of sheet metal which is closed at its upper end by an end member 11 and at its lower end by an end member 12. The end member 11 has an outwardly or laterally extending annular flange 13 over which the adjacent end of the cylinder 10 is flanged or crimped as indicated at 14. The flange of the cylinder is such that both sides of the flange 13 are embraced substantially as shown. The opposite end of the cylinder 10 is similarly crimped over an annular flange 15.

The end members 11 and 12 may be formed from die castings and as shown, the end member 11 is formed with an attaching yoke 16. For admitting liquid under pressure to the end member 11, a passage 17 is formed of substantially L-shape with a screw threaded portion 18 to which a suitable hose or tube may be attached. The arrangement is such that liquid passes laterally of the end member and thence centrally or axially to the cylinder 10, terminating in a cup-shaped cavity 19 somewhat larger than a nut 20 which is secured to the reduced end of a piston rod 21.

The inner end portion of the end member 11 is formed with a ring-like boss 22, the peripheral surface of which is spaced substantially from the inner wall of the cylinder 10. In this space is compressed a resilient rubber ring 23 which snugly impinges against the inner wall of the cylinder 10 as well as the boss 22 to form a substantially fluid tight seal. The ring-like boss 22 terminates in a reduced annular extension 24 on which is mounted a metallic washer 25 which insures the retention of the rubber ring 23 in the proper position.

A suitable staking tool is applied to the annular extension 24 to cause the metal thereof to flow outwardly to form an annular series of spaced radially extending grooves terminating in fingers 26. The radial fingers 26 formed subsequent to the positioning of the metallic washer 25 and extending beyond the inner edge thereof, serve the purpose of retaining the metallic washer 25 on its seat against the ring-like boss 22, and the grooves enable pressure fluid to flow to the outer portion of the piston when the latter is at the extreme end of its stroke.

The end member 12 is formed with an axial passage 27 through which the piston rod 21 slides, suitable packing 28 being disposed in a cavity at the outer end of the end member to prevent the leakage of liquid from the interior of the cylinder. A fluid passage 29 is formed centrally of the end member and terminates in a screw-threaded port 30 to which a tube or hose may be suitably attached. The end member 12 is likewise formed with an annular boss 22a and receives a resilient rubber ring 23a.

A reduced annular extension 24a is formed by a suitable staking tool with a series of radial grooves 26b and fingers 26a, similar to the structure and arrangement above described in connection with the end member 11. The arrangement and operation of these parts are the same as above described.

The upper end of the piston rod 21 is formed with a reduced extension 31 and clamped by the nut 20 against the shoulder formed by the reduced portion 31 is a piston which consists of a pair of discs 32 and 33, cup washers 34 and an intermediate rubber disc 35.

From the above description, it will be manifest that I have produced an exceedingly simple assembly which can be inexpensively manufactured on a production basis. The entire unit is light in weight and owing to the structural features above pointed out, the various joints are effectively sealed against leakage. The simple arrangement by which the piston is spaced from the end members at the extreme ends of its stroke, enables the pressure fluid to operate against a greater piston area to commence its stroke in either direction. By employing the same staking which secures the metallic washers in place, the structure is further simplified and the cost reduced.

It is to be understood that numerous changes in details of construction, arrangement and operation may be effected without departing from the spirit of the invention especially as defined in the appended claim.

What I claim is:

In an hydraulic cylinder, an elongate sheet metal cylinder, end members closing opposite ends of said cylinder, each end member having a fluid passage leading from the outside to the interior of the cylinder, an outwardly extending shoulder on each end member, a flange on each end of said cylinder embracing said shoulder, a ring-like boss on each end member projecting inwardly from said shoulder and forming with said cylinder an inwardly facing cavity, a resilient rubber ring in each cavity compressed to form a substantially fluid tight seal, a reduced extension on each ring-like boss providing a seat, a metallic washer on each seat, a plurality of radial fingers integral with each reduced extension for securing the respective ring in place, and radial grooves in each reduced extension.

JOHN B. PARSONS.